United States Patent
Mak

(10) Patent No.: US 10,466,886 B2
(45) Date of Patent: Nov. 5, 2019

(54) DETERMINING A TARGET POSITION FOR SCROLLING CONTENT

(71) Applicant: RESEARCH IN MOTION LIMITED, Waterloo (CA)

(72) Inventor: Genevieve Elizabeth Mak, Toronto (CA)

(73) Assignee: BlackBerry Limited, Waterloo, Ontario (CA)

(*) Notice: Subject to any disclaimer, the term of this patent is extended or adjusted under 35 U.S.C. 154(b) by 1595 days.

(21) Appl. No.: 13/628,330

(22) Filed: Sep. 27, 2012

(65) Prior Publication Data

US 2013/0088520 A1     Apr. 11, 2013

Related U.S. Application Data

(60) Provisional application No. 61/544,366, filed on Oct. 7, 2011.

(51) Int. Cl.
   *G06F 3/00*           (2006.01)
   *G06F 3/0485*      (2013.01)
   *G06F 3/0488*      (2013.01)

(52) U.S. Cl.
   CPC .......... *G06F 3/0485* (2013.01); *G06F 3/0488* (2013.01)

(58) Field of Classification Search
   CPC ........................ G06F 3/0485; G06F 2203/014
   USPC ........................................................ 345/684
   See application file for complete search history.

(56) References Cited

U.S. PATENT DOCUMENTS

| | | | |
|---|---|---|---|
| 2003/0122787 A1 | 7/2003 | Zimmerman | |
| 2006/0075358 A1 | 4/2006 | Ahokas | |
| 2007/0132789 A1* | 6/2007 | Ording et al. | 345/684 |
| 2008/0024444 A1* | 1/2008 | Abe et al. | 345/157 |
| 2010/0251166 A1* | 9/2010 | Matsui | 715/784 |
| 2010/0277496 A1* | 11/2010 | Kawanishi | G06F 3/0485 345/589 |
| 2012/0062604 A1* | 3/2012 | Lobo | G06F 3/04883 345/684 |

FOREIGN PATENT DOCUMENTS

| | | |
|---|---|---|
| EP | 1727032 | 11/2006 |
| EP | 2302493 | 3/2011 |
| WO | WO2010024969 | 3/2010 |

OTHER PUBLICATIONS

Ishak, Edward W., and Steven K. Feiner. "Content-aware scrolling." Proceedings of the 19th annual ACM symposium on User interface software and technology. ACM, 2006.*

Chiu et al., Content Based Automatic Zooming: Viewing Documents on Small Displays, ACM Multimedia Mar. 2008 (4 pages).

Ishak et al., Content-Aware Scrolling, UIST 2006, Oct. 15-18, 2006, Montreux, Switzerland (4 pages).

www.library.developer.nokia.com—Java Developer's Library 3.9 > Developer's guides > UI and graphics—Touch UI Jun. 2011 (3 pages).

(Continued)

*Primary Examiner* — Hai Tao Sun

(74) *Attorney, Agent, or Firm* — Trop, Pruner & Hu, P.C.

(57) ABSTRACT

An electronic device receives a command to scroll content for display in a display device. An initial target position to scroll to is determined. An updated target position in the content to scroll to is determined based on identifying an element in the content.

17 Claims, 3 Drawing Sheets

(56) References Cited

OTHER PUBLICATIONS

Villmor et al., Touch Gesture Reference Guide—Core Gestures—Basic gestures for most touch commands, Apr. 15, 2010 (7 pages).
Apple, Scroll View Programming Guide for iOS User Experience: Windows & Views, Jun. 6, 2011 (38 pages).
Canadian Intellectual Property Office, Office Action for Canadian Appl. No. 2,790,986 dated Sep. 12, 2014 (4 pages).
European Patent Office, Search Report for European Appl. No. 12186233.8, dated Jan. 4, 2013 (7 pages).
Canadian Intellectual Property Office, Office Action for Canadian Appl. No. 2,790,986 dated Aug. 11, 2015 (4 pages).
Canadian Intellectual Property Office, Office Action for Canadian Appl. No. 2,790,986 dated Sep. 19, 2016 (5 pages).
Canadian Intellectual Property Office, Office Action for Canadian Appl. No. 2,790,986 dated Aug. 1, 2017 (5 pages).
European Patent Office, Communication pursuant to Article 94(3) EPC for Appl. No. 12186233.8 dated Jun. 22, 2017 (7 pages).
Canadian Intellectual Property Office, Office Action for Canadian Appl. No. 2,790,986 dated Jul. 6, 2018 (10 pages).
European Patent Office, Summons to attend oral proceedings pursuant to Rule 115(1) EPC dated Jul. 9, 2018 (11 pages).

* cited by examiner

```
<article>
    ARTICLE 1
        <section>
            SECTION 1
        </section>
        <section>
            SECTION 2
        </section>
</article>
    ⋮
<article>
    ARTICLE 2
        <section>
            SECTION A
        </section>
        <section>
            SECTION B
        </section>
</article>
    ⋮
```

FIG. 4

DETERMINING A TARGET POSITION FOR SCROLLING CONTENT

CROSS-REFERENCE TO RELATED APPLICATION

This application claims the benefit under 35 U.S.C. § 119(e) of U.S. Provisional Application No. 61/544,366 filed Oct. 7, 2011, which is hereby incorporated by reference.

BACKGROUND

Electronic devices can render content for display by a display device. Various user inputs can be received by an electronic device to control the view of the displayed content. For example, the user inputs can specify scrolling, zooming, and so forth. Scrolling can be indicated by using slidable scroll bars or other displayed control icons, or using an input control device (e.g. mouse, touchpad, etc.). Alternatively, scrolling can also be indicated by a touch event on a touch-screen display device, where the touch event can include a sliding action, a drag action, or a flick action.

BRIEF DESCRIPTION OF THE DRAWINGS

Some embodiments are described with respect to the following figures:

FIG. 4 illustrates customized tags for identifying different types of content, useable to determine an updated target position for scrolling, according to some implementations.

DETAILED DESCRIPTION

A user of an electronic device can cause scrolling of content that is displayed in a display device of the electronic device. The scrolling can be in response to any of various different types of input actions of the user at an input device. For example, the input actions to perform scrolling can include activating an input control device, such as a mouse, touchpad, or other input device. Alternatively, the input actions can include activating a displayed control icon, such as a slidable scroll bar, a control arrow, and so forth. As yet another alternative, the input actions can include touch-based actions, such as a sliding action, a drag action, or a flick action on a touch-based display device. In the latter examples above, the touch-based display device is considered a type of input device.

Certain input actions to perform scrolling can result in continued scrolling even after a user has released the mechanism that initiated the scrolling. An example of such input action is the flick action on a touch-based display device. The flick action involves touching the touch-based display device with the user's finger, dragging in the scroll direction, and then lifting the finger from the touch-based display device. Even after the finger has been lifted, the scrolling of content continues for some distance, where the amount of scrolling after lifting of the finger depends on the velocity of the finger's drag action. This type of scrolling is also referred to as momentum-based scrolling.

There can be other types of input actions that can cause momentum-based scrolling. For example, a user can perform a flick action on a touchpad to cause momentum-based scrolling, a user can click on a displayed control icon to cause momentum-based scrolling, and so forth.

With momentum-based scrolling, a user may not know where the scroll will end. In some cases, the scroll may end at a portion of the displayed content that does not contain useful information (from the user's perspective). In accordance with some embodiments, techniques or mechanisms are provided to allow for a determination of a target position to scroll to, where the target position is based on a property of a scroll command and based on identifying an element in the content. Such techniques or mechanisms increase the likelihood that momentum-based scrolling will scroll to a position in the content that contains useful information (from the user's perspective).

Figure 1:
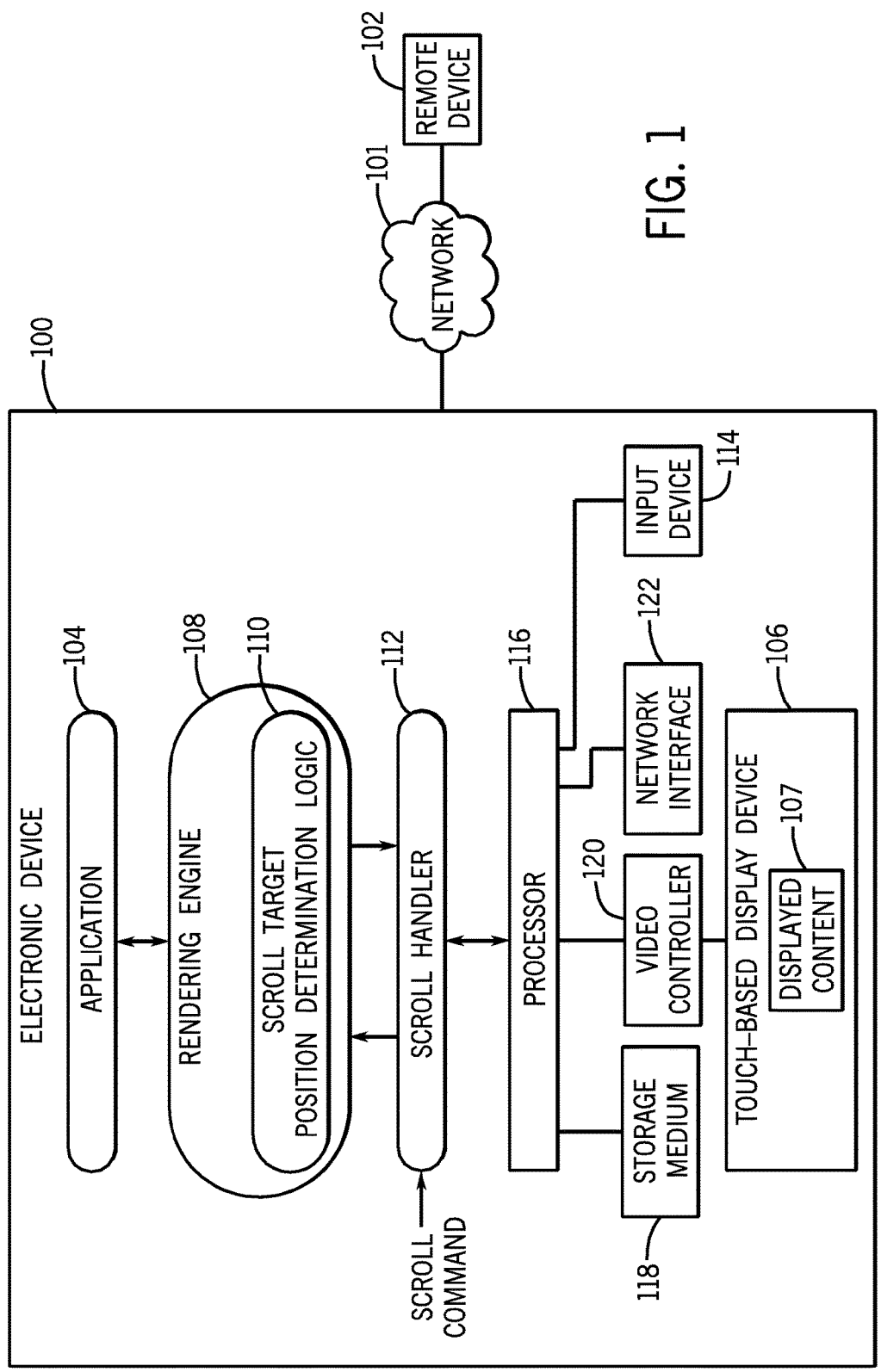
FIG. 1 is a block diagram of an example electronic device according to some implementations.

FIG. 1 is a block diagram of an example network arrangement that includes an electronic device 100 and a remote device 102, which are coupled over a network 101. Although just one electronic device 100 and remote device 102 are shown in FIG. 1, it is noted that a network arrangement can include multiple electronic devices 100 or remote devices 102. Examples of the electronic device 100 include a computer (e.g. desktop computer, notebook computer, tablet computer, and so forth), a personal digital assistant (PDA), a mobile telephone, an electronic appliance or other type of electronic device.

The remote device 102 can be any device that is able to communicate data to the electronic device 100. Examples of the remote device 102 include an electronic mail server (that communicates electronic mail messages to client devices), a web server device, a proxy device, and so forth. The remote device 102 can be implemented with a server computer or a system having multiple server computers, as examples.

The electronic device 100 includes an application 104 that is able to receive data (either from an internal source inside the electronic device or from an external source such as the remote device 102) and to display the data on a display device 106 of the client device 100. For example, the application 104 can be an electronic mail application to present electronic mail messages in the display device 106. In other implementations, the application 104 can be a web browser (to display web content), a social networking application (to display social networking messages), or any other type of application that allows a user of the electronic device 100 to view displayed content 107 in the display device 106.

The display device 106 can be a touch-based display device that has a touch-sensitive screen. Touch-based actions on the touch-sensitive screen are detectable by the electronic device 100 and can cause corresponding actions to be performed, where the actions can include a scroll action (to scroll the displayed content 107), zoom action (to zoom into or out from the displayed content), or other actions.

The electronic device 100 also includes a rendering engine 108 that processes content received by the application 104 to allow the received content to be displayed in the display device 106. In some implementations, the content is defined by a markup language such as HTML (Hypertext Markup Language) or other language. Generally, the rendering engine 108 parses and renders content according to various defined formats, such as according to the HTML format or other formats. The rendering engine 108 can include a parser to parse received content, a layout process to place various nodes representing different parts of the received content in a layout as the respective parts of the content would appear in the display device 106, and a painter to paint the content according to the layout specified by the layout process.

In some examples, the rendering engine 108 can be a WebKit rendering engine, which is an open source rendering engine used for rendering web pages. In other implementations, the rendering engine 108 can be another type of rendering engine.

In accordance with some embodiments, the rendering engine 108 includes scroll target position determination logic 110 that is able to identify a target position to scroll to in response to a scroll command, such as a momentum-based scroll command received due to a flick action on the touch-sensitive display screen of the display device 106. In alternative implementations, a momentum-based scroll command can be received due to another user input, such as by use of an input device 114 (e.g. a touchpad, a mouse, etc.).

The scroll target position determination logic 110 is able to identify the target position based on a property of the scroll command and based on identifying an element (or elements) in the content, to increase the likelihood that momentum-based scrolling will scroll to a position in the content that contains useful information (from the user's perspective).

The electronic device 100 also includes a scroll handler 112, which receives and processes a scroll command, such as a momentum-based scroll command. A momentum-based scroll command can be associated with various properties, including an initial velocity of the displayed content at the time point where the user's finger has lifted from the touch-sensitive display screen (and is no longer in contact with the touch-sensitive display screen), and an acceleration due to a target friction to apply in slowing down the scrolling. The acceleration can be a predefined constant value. Based on the initial velocity and acceleration, the total distance to travel across the content to be displayed can be calculated by the scroll handler 112. The scroll handler 112 uses this total travel distance to determine an initial target position in the content to be displayed to travel to.

However, since it is possible that the initial target position can be in a portion of the content to be displayed that does not include useful information (from the user's perspective), the scroll handler 112 can interact with the scroll target position determination logic 110 to update the target position based on identifying element(s) in a portion of the content to be displayed around the initial target position.

The scroll handler 112 can provide certain information to the scroll target position determination logic 110. For example, such information can include the initial target position, or a region (also referred to as a "padding") that includes the initial target region, or both. More generally, the information provided by the scroll handler 112 to the scroll target position determination logic 110 allows the scroll target position determination logic 110 to determine what portion of the content to be displayed to look in for determining what element(s) would likely be of interest to a user, and to update the target position (modified from the initial target position) based on such determination. In some cases, the scroll target position determination logic 110 can determine that the initial target position will result in scrolling to a portion of the content that contains useful information, in which case the scroll target position determination logic 110 does not update the initial target position.

In alternative implementations, instead of providing the scroll target position determination logic 110 in the rendering engine 108, the scroll target position determination logic 110 can be included in the scroll handler 112, can be provided as a separate module, or can be provided in another module in the electronic device 100.

As further shown in FIG. 1, the electronic device 100 includes a processor (or multiple processors) 116. The processor(s) 116 is (are) connected to a storage medium (or media) 118, a video controller 120, and a network interface 122. The video controller 120 is connected to the display device 106 to control the display of data in the display device 106. The video controller 120 (or a separate controller) can also receive signals due to touch events on the touch-sensitive display screen of the touch-based display device 106.

Examples of the storage medium 118 include one or multiple disk-based storage devices, one or more integrated circuit storage devices, and so forth. The network interface 122 allows the electronic device 100 to communicate over the data network 101.

Figure 2:
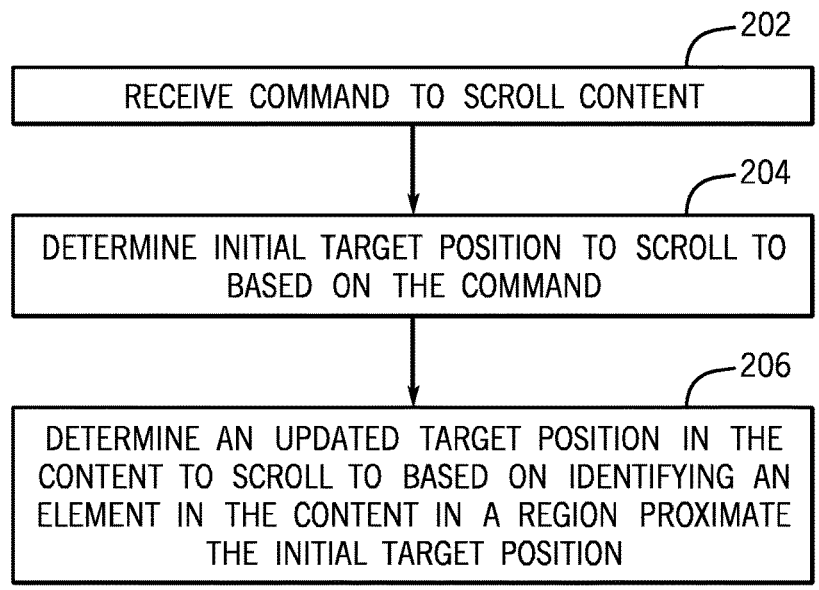
FIG. 2 is a flow diagram of a process of scrolling, in accordance with some implementations.

FIG. 2 is a flow diagram of a process performed by the electronic device 100, according to some embodiments. In the process of FIG. 2, the scroll handler 112 receives (at 202) a scroll command to scroll content being displayed in the display device 106. The scroll handler 112 determines (at 204) an initial target position to scroll to based on the scroll command.

Based on the initial target position, the scroll target position determination logic 110 determines (at 206) an updated target position in the content to scroll to in response to the scroll command, where the updated target position is determined based on identifying an element in the content in a region proximate the initial target region.

Figure 3A:
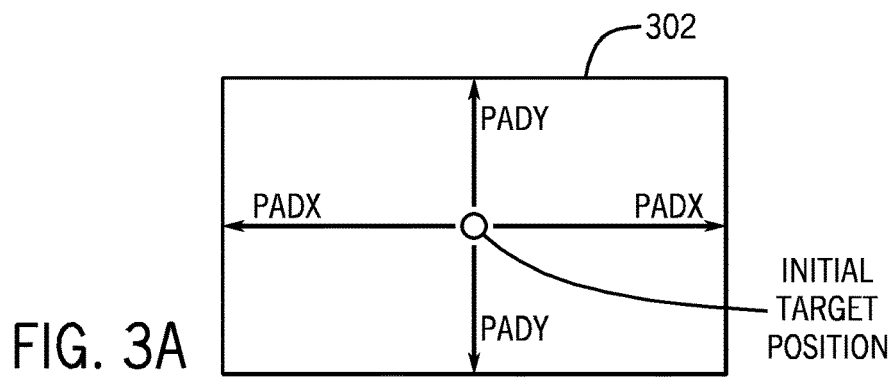
FIGS. 3A and 3B illustrate example regions within a predefined distance of an initial target position, according to some implementations.

The region is "proximate" the initial target region if the region is within a predefined distance of the initial target position. The "region within a predefined distance" can include a padding region 302 (which can have a rectangle shape or another shape) around the initial target position, as shown in FIG. 3A. In the example of FIG. 3A, the padding region 302 is defined by a padding distance PADY (in the Y or vertical direction) on either side of the initial target position, and a padding distance PADX (in the X or horizontal direction) on either side of the initial target position.

Figure 3B:
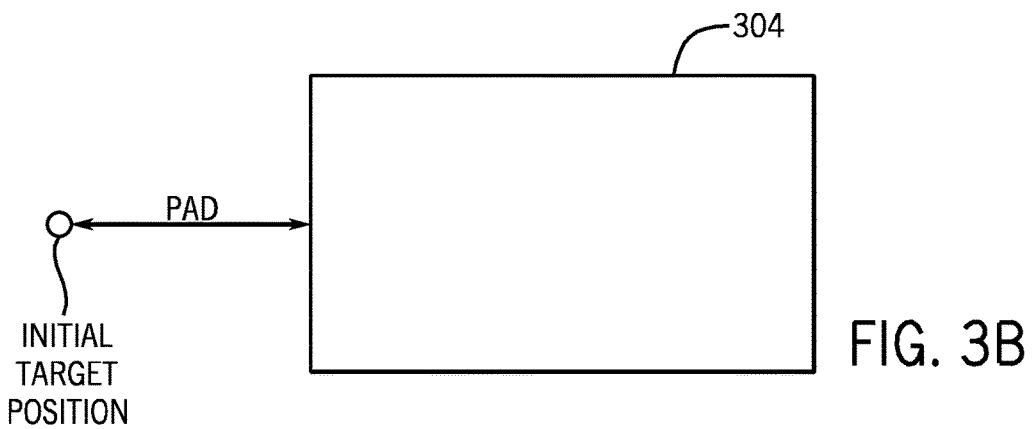

Alternatively, as shown in FIG. 3B, the "region within a predefined distance" can refer to a region 304 that does not include the initial target position, but is within the predefined distance (e.g. PAD) of the initial target position.

As noted above, content to be displayed can be in HTML format. With HTML content (or content according to any other markup language), tags are used to assist the rendering engine 108 (FIG. 1) in interpreting the content. Tags are elements used for annotating content (which can include text, image, video, audio, flash, advertisement, and so forth). The tags can define the structure of the content (e.g., section heading, paragraph, title, line break, etc.) or an attribute of the content (font, color, style, etc.). Tags can also provide other instructions or definitions of content. Tags include opening tags and closing tags, where a pair of an opening tag and a closing tag defines an element, such as a text element, image element, video element, audio element, a flash content element, an advertisement element, or other element.

The region 302 or 304 (or any other region within a predefined distance of the initial target position determined based on a scroll command) can include one or more elements (e.g. text element, image element, video element, audio element, flash content element, advertisement element, etc.). The scroll target position determination logic 110 of FIG. 1 can identify the element(s) in the region 302 or 304, and can update the target position for the scrolling based on the identified element(s).

In some implementations, the scroll target position determination logic 110 returns the updated target position to the scroll handler 112, which is then used by the scroll handler 112 to perform the scrolling in response to the scroll command received at 202 in FIG. 2. Alternatively, instead of returning the updated target position, the scroll target position determination logic 110 can instead provide a list of one or more elements in the region that is proximate the initial target position. This list of one or more elements is provided to the scroll handler 112, which can then determine the updated target position based on the list of one or more elements. In some examples, the list of one or more elements can be in the form of a list of one or more content rectangles that contain respective content. Each of the one or more content rectangles can be associated with annotation to indicate the type of content (e.g. text, image, video, audio, flash, advertisement, etc.) in the respective content rectangle. The scroll handler 112 can use the content rectangle(s) and associated annotation to identify which element would likely be of most interest to a user, and to determine a target position for scrolling accordingly.

If the region proximate the initial target position includes multiple elements, then a predefined criterion (or criteria) can be used by the scroll target position determination logic 110 or scroll handler 112 to determine which of the multiple elements would be of most interest to a user. The predefined criterion (or criteria) can rank certain types of elements (such as an advertisement element) lower than other types of elements. The predefined criterion (or criteria) can also rank different elements according to the general type of content that is being viewed by the user. For example, if the content being viewed is part of an online news article, then it is likely that a text element (containing a passage of the news article) would likely be of more interest to the user than a video element or audio element, for example. On the other hand, if the content being viewed is online gaming content, then the content that would likely be of more interest to the user would be an image element. As other examples, the predefined criterion (or criteria) can include relative sizes of the elements in the region (e.g. a larger element may be ranked higher than a smaller element, or vice versa), or relatively distances of the elements in the region to the initial target position (e.g. a closer element may be ranked higher than a farther element).

In alternative embodiments, custom tags can also be included in content (e.g. HTML content) to be displayed. These custom tags are customized for use in performing scrolling. Different customized tags can identify different types of content. The different types of content can be assigned different levels of priority by the author of the content, such that in a region proximate the initial target region that contains multiple elements (associated with respective different customized tags), the scroll target position determination logic 110 or scroll handler 112 can use the prioritization of the different customized tags to select which one to use for the purpose of determining an updated target position for scrolling. The priorities of the customized tags can be coded into the customized tags themselves, or alternatively, the scroll target position determination logic 110 or scroll handler 112 can maintain stored information specifying relative priorities of different types of content indicated by different customized tags.

Examples of customized tags are provided in FIG. 4, which shows content associated with an online news magazine for example. The news magazine includes multiple articles (including Article 1 and Article 2), which are identified by respective pairs of customized tags <article> </article>. Each article also includes respective sections, identified by respective pairs of customized tags <section> </section>. In the example of FIG. 4, typical HTML or other markup language tags for identifying paragraphs, headings, etc., are not shown.

When scrolling in response to a scroll command (such as a momentum-based scroll command), the scroll target position determination logic 110 or scroll handler 112 can identify elements associated with customized tags (e.g. <article> or <section> in the example of FIG. 4) in a region proximate the initial target position. Using predefined criterion (or criteria), the scroll target position determination logic 110 or scroll handler 112 can select an updated target position that corresponds to an article or a section. For example, for a faster scroll (associated with a scroll command with a relatively high initial velocity), the updated target position can correspond to a portion of an article proximate the initial target position. The concept here is that for faster scrolling, the user is likely to wish to scroll from article to article in the news magazine. On the other hand, for a slower scroll (associated with a scroll command with a relatively low initial velocity), the updated target position can correspond to a portion of a section within an article proximate the initial target position. The concept here is that for slower scrolling, the user is likely to wish to scroll from section to section within the same article in the news magazine.

Other examples of customized tags and other predefined criteria can be used in other implementations.

The following discusses further details regarding a scrolling technique or mechanism that is employed in response to a momentum-based scroll command. Such a scrolling technique or mechanism is referred to as a kinetic scrolling technique or mechanism. Kinetic scrolling can be based on the following formula:

$$dx = v0*t + c*a*t*t,\quad\text{(Eq. 1)}$$

where c is a predefined constant, dx represents the distance to be traveled in response to the scroll command, v0 represents the initial velocity, t represents the elapsed time of scrolling, and a represents acceleration due to friction (to use for gradually slowing down the scroll until the target position is reached).

Note that different formulas can be used in other examples.

In examples where the scroll command is caused by a user's finger dragging along the touch-sensitive display screen and then lifting of the user's finger from the touch-sensitive display screen, the initial velocity v0 is the velocity at the point that the user's finger was lifted from the touch-sensitive display screen after the drag operation, and the distance to be traveled (dx) is the distance to be traveled to from the point where the user's finger was lifted from the touch-sensitive display screen to the target position. In some implementations, after the user drags the user's finger along the touch-sensitive display screen and lets go, the initial velocity v0 is calculated based on the distance (d0) traveled by the content due to the drag operation, and time (t0) taken to travel that distance (d0):

$$v0 = d0/t0.\quad\text{(Eq. 2)}$$

When the user lifts his finger from the touch-sensitive display screen, the time (t) that it would take to slow down to a stop, based on the friction represented by the acceleration a is calculated as follows:

$$t = v0/a.\quad\text{(Eq. 3)}$$

The values of v0 and t computed according to Eqs. 2 and 3, respectively, are plugged into Eq. 1 to obtain dx. Once dx is known, the initial target position at which the scroll should end can be determined (the initial target position is equal to a current position at the start of the scroll plus dx).

The foregoing assumes scrolling in the x direction, which can be the horizontal direction. Note that scrolling can also be in the y direction (vertical direction). The same computations can be used to determine dy, the distance to travel in the y direction due to the scroll. Additionally, it is possible that a scroll action can have components in both the x and y directions (such as a scroll in a slanted or diagonal direction). In that case, the computations of dx and dy can be combined to determine the target position of the scroll.

The initial target position is sent by the scroll handler 112 to the scroll target position determination logic 110 (FIG. 1) to allow for a determination of an updated target position, as discussed above. Once the updated target position is computed, the distance traversed is changed—this new distance traversed is represented as dx'. The new distance traversed dx' is equal to the updated target position less the current position at the start at the scroll.

With the new dx', Eq. 1 can be used to compute a new acceleration (a') to be used to reach the updated target position, as follows:

$$a'=(1/c)*(dx'*-v0*t)/(t*t). \quad \text{(Eq. 4)}$$

Once the new acceleration (a') is computed, a new time (t') to traverse from the current position at the start of the scroll to the updated target position is also computed. Once a' and t' are computed, the scrolling of the content uses these values to scroll to the updated target position, which gradual slowing based on a' and the total elapsed time of the scroll equal to t'.

By using techniques or mechanisms according to some implementations, the likelihood of ending up at portion of content at the end of a scroll that contains useful content (from the user's perspective) is increased. This reduces the likelihood that the user will see a blank space or an advertisement or other less desirable content at the end of the scroll.

Machine-readable instructions of modules described above (including the application 104, scroll target position determination logic 110, rendering engine 108, and scroll handler 112 of FIG. 1) are loaded for execution on processor(s) (such as 116 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of an electronic device, comprising:
receiving a command to scroll content for display in a display device of the electronic device;
determining a first distance from a start of a scroll to an initial target position based on a property of the command and on a first value of a parameter representing friction, wherein the property includes an initial velocity of scrolling of the content;
determining an updated target position in the content to scroll to in response to the command, wherein the updated target position is determined based on identifying an element in the content in a region within a predefined distance of the initial target position, wherein identifying the element comprises:
identifying an article in the content associated with an article tag identifying the article in response to the initial velocity of scrolling of the content, as specified by the command, being a higher initial velocity, and
identifying a section within the article associated with a section tag identifying the section in response to the initial velocity of scrolling of the content, as specified by the command, being a lower initial velocity that is lower than the higher initial velocity, the section tag different from the article tag;
determining, based on the updated target position, an updated distance, different from the first distance, to be traveled from the start of the scroll;
calculating a second, different value of the parameter representing friction based on the updated distance; and
scrolling to the updated target position using the second value of the parameter representing friction.

2. The method of claim 1, wherein the display device is a touch-based display device, and wherein receiving the command comprises receiving the command in response to a touch event at the touch-based display device.

3. The method of claim 1, wherein identifying the element in the region comprises identifying the element in a padding region that contains the initial target position.

4. The method of claim 1, wherein identifying the element in the region comprises identifying the element from among plural elements in the region, wherein the identified element is selected from the plural elements based on at least one criterion, the at least one criterion comprising a criterion based on the initial velocity of scrolling of the content as specified by the command.

5. The method of claim 4, wherein the plural elements are associated with respective tags including the article tag and the section tag, and wherein the identified element is selected from the plural elements further based on the tags.

6. The method of claim 5, wherein the tags indicate priorities of corresponding elements of the plural elements, and the identified element is selected from the plural elements further based on the priorities of the corresponding elements.

7. The method of claim 1, wherein the parameter representing friction includes acceleration.

8. The method of claim 1, wherein calculating the second, different value of the parameter representing friction uses the initial velocity also used in determining the first distance.

9. An electronic device, comprising:
an input device; and
at least one processor configured to:
receive a command due to activation of the input device to scroll content for display in a display device;
determine, using an initial value of a parameter representing friction, an initial target position to scroll to based on a property of the command, wherein the property comprises an initial velocity of scrolling of the content;
select an element from a plurality of elements in the content, the selecting comprising:
selecting a first element associated with a first tag in response to the initial velocity of scrolling of the content, as specified by the command, being a higher initial velocity, wherein the first element is an article in the content, and the first tag is an article tag identifying the article, and
selecting a second element associated with a second tag different from the first tag in response to the initial velocity of scrolling of the content, as specified by the command, being a lower initial velocity that is lower than the higher initial velocity, wherein the second element is a section within the article, and the second tag is a section tag identifying the section;
determine an updated target position in the content to scroll to in response to the command, wherein the updated target position is determined based on a location of the selected element in the content;
update a value of the parameter representing friction in response to the updated target position determined based on the location of the selected element in the content; and
scroll the content displayed by the display device to the updated target position using the updated value of the parameter representing friction.

10. The electronic device of claim 9, wherein the input device includes a touch-sensitive screen of the display device.

11. The electronic device of claim 9, wherein the at least one processor is configured to:
determine the initial target position based on a first distance from a start of a scroll, the first distance determined based on the initial value of the parameter representing friction;
determine, based on the updated target position, an updated distance, different from the first distance, to be traveled from the start of the scroll; and
update the value of the parameter representing friction based on the updated distance.

12. The electronic device of claim 11, wherein the at least one processor is configured to:
determine the first distance further based on the initial velocity of scrolling of the content; and
determine the updated value of the parameter representing friction further based on the same initial velocity of scrolling of the content.

13. An article comprising at least one non-transitory machine-readable storage medium storing instructions that upon execution cause an electronic device to:
receive an indication of a touch event at a touch-based display device, wherein the indication is to cause scrolling of content for display by the touch-based display device;
determine an initial target position to scroll to in response to a property of the indication, wherein determining the initial target position is based on a first value of a parameter representing friction, wherein the parameter representing friction includes acceleration due to friction, wherein the property comprises an initial velocity of scrolling of the content based on the touch event;
determine an updated target position to scroll to based on identifying an element in the content, the identifying of the element comprising:
identifying a first element associated with a first tag in response to the initial velocity of scrolling of the content, based on the touch event, being a higher initial velocity, wherein the first element is an article in the content, and the first tag is an article tag identifying the article, and
identifying a second element associated with a second tag different from the first tag in response to the initial velocity of scrolling of the content, based on the touch event, being a lower initial velocity that is lower than the higher initial velocity, wherein the second element is a section within the article, and the second tag is a section tag identifying the section;
update the parameter representing friction to a second, different value, based on the updated target position determined based on the identifying of the element in the content; and
scroll the content displayed by the touch-based display device to the updated target position using the second value of the parameter representing friction.

14. The article of claim 13, wherein identifying the element in the content comprises identifying the element in a region within a predefined distance of the initial target position.

15. The article of claim 13, wherein determining the updated target position is performed by a scroll handler in response to a list of elements provided by a rendering engine, wherein identifying the element in the content is from the list of elements comprising the first element and the second element.

16. The article of claim 13, wherein the initial target position is determined based on a first distance from a start of a scroll, the first distance determined based on the first value of the parameter representing friction, and wherein the instructions upon execution cause the electronic device to further:
determine, based on the updated target position, an updated distance, different from the first distance, to be traveled from the start of the scroll,
wherein the parameter representing friction is updated to the second, different value based on the updated distance.

17. The article of claim 16, wherein the first distance is determined based on the initial velocity of scrolling of the content, and wherein updating the parameter representing friction to the second, different value is based on the same initial velocity of scrolling of the content.

* * * * *